US010156289B2

(12) United States Patent
De Stefani et al.

(10) Patent No.: US 10,156,289 B2
(45) Date of Patent: Dec. 18, 2018

(54) AXLE ASSEMBLY HAVING MULTIPLE CLUTCH COLLARS

(71) Applicant: Meritor do Brasil Sistemas Automotivos Ltda., Osasco (BR)

(72) Inventors: Armando Marcelo Rivero De Stefani, Osasco (BR); Adriano Esperidião, Osasco (BR); Jose Renan da Silva, Osasco (BR); Rodrigo Lacerda Soffner, Osasco (BR)

(73) Assignee: Meritor do Brasil Sistemas Automotivos Ltda., Osasco (BR)

( * ) Notice: Subject to any disclaimer, the term of this patent is extended or adjusted under 35 U.S.C. 154(b) by 73 days.

(21) Appl. No.: 15/451,775

(22) Filed: Mar. 7, 2017

(65) Prior Publication Data
US 2018/0259048 A1 Sep. 13, 2018

(51) Int. Cl.
F16H 48/24 (2006.01)
B60K 17/36 (2006.01)
B60K 17/16 (2006.01)
F16H 48/08 (2006.01)
F16H 48/10 (2012.01)
B60K 17/02 (2006.01)
F16H 48/36 (2012.01)
B60K 17/346 (2006.01)
F16D 11/10 (2006.01)
F16H 48/06 (2006.01)

(52) U.S. Cl.
CPC ............. F16H 48/24 (2013.01); B60K 17/02 (2013.01); B60K 17/16 (2013.01); B60K 17/3462 (2013.01); B60K 17/36 (2013.01); F16D 11/10 (2013.01); F16H 48/06 (2013.01); F16H 48/08 (2013.01); F16H 48/10 (2013.01); F16H 48/36 (2013.01)

(58) Field of Classification Search
CPC .......... F16H 48/08; F16H 48/10; F16H 48/24; F16H 48/36; B60K 17/02; B60K 17/16; B60K 17/36
USPC .................................................. 475/221, 231
See application file for complete search history.

(56) References Cited

U.S. PATENT DOCUMENTS

| | | | |
|---|---|---|---|
| 6,540,640 B2 * | 4/2003 | Hibbler | B60K 23/08 475/230 |
| 7,093,681 B2 * | 8/2006 | Strain | B60K 17/36 180/14.2 |
| 7,211,017 B2 | 5/2007 | Green et al. | |
| 7,291,083 B2 * | 11/2007 | Almaguer | B60K 17/36 180/249 |

(Continued)

FOREIGN PATENT DOCUMENTS

WO 2013032477 A1 3/2013

OTHER PUBLICATIONS

United States Patent and Trademark Office, U.S. Appl. No. 14/822,958, filed Aug. 11, 2015.

(Continued)

Primary Examiner — Leslie A Nicholson, III
(74) Attorney, Agent, or Firm — Brooks Kushman P.C.

(57) ABSTRACT

An axle assembly having a first clutch collar and a second clutch collar. The first clutch collar may be selectively engageable with a drive gear that may be rotatably disposed on an input shaft. The second clutch collar may be selectively engageable with a side gear of an interaxle differential unit.

20 Claims, 9 Drawing Sheets

(56) References Cited

U.S. PATENT DOCUMENTS

| | | | |
|---|---|---|---|
| 8,398,520 B1* | 3/2013 | Bassi | B60K 17/346 |
| | | | 475/221 |
| 8,651,994 B2 | 2/2014 | Bassi et al. | |
| 9,797,496 B2* | 10/2017 | Martin | F16H 48/08 |
| 9,816,603 B2* | 11/2017 | Hayes | F16H 57/0483 |
| 10,001,201 B2* | 6/2018 | Martin | F16H 48/08 |
| 2004/0089495 A1* | 5/2004 | Strain | B60K 17/36 |
| | | | 180/383 |
| 2014/0243137 A1* | 8/2014 | Kwasniewski | F16H 57/0445 |
| | | | 475/160 |
| 2015/0219197 A1* | 8/2015 | Trost | F16H 48/34 |
| | | | 475/150 |
| 2016/0341260 A1 | 11/2016 | Hirao | |
| 2017/0074390 A1* | 3/2017 | Hayes | F16H 57/0483 |
| 2017/0204956 A1* | 7/2017 | Martin | F16H 48/08 |
| 2018/0128361 A1* | 5/2018 | Martin | F16H 48/08 |

OTHER PUBLICATIONS

European Patent Office, Extended European Search Report for Application No. EP18153353.0-1012, dated Sep. 11, 2018.

\* cited by examiner

AXLE ASSEMBLY HAVING MULTIPLE CLUTCH COLLARS

TECHNICAL FIELD

This disclosure relates to an axle assembly having multiple clutch collars that may be disposed on opposite sides of an interaxle differential unit.

BACKGROUND

An inter-axle differential lock shift mechanism is disclosed in U.S. Pat. No. 7,211,017.

SUMMARY

In at least one embodiment, an axle assembly is provided. The axle assembly may include an input shaft, a drive gear, an interaxle differential unit, an output shaft, a first clutch collar, and a second clutch collar. The input shaft may be rotatable about a first axis and may extend through the drive gear. The drive gear may be rotatable with respect to the input shaft. The interaxle differential unit may be disposed on the input shaft. The interaxle differential unit may have a side gear. The side gear may receive the input shaft such that the side gear may be rotatable with respect to the input shaft. The output shaft may be rotatable with respect to the side gear. The first clutch collar may be selectively engageable with the drive gear. The second clutch collar may receive the output shaft and may be selectively engageable with the side gear.

In at least one embodiment, an axle assembly is provided. The axle assembly may include an input shaft, a drive gear, an interaxle differential unit, an output shaft, a first clutch collar, and a second clutch collar. The input shaft may be rotatable about a first axis and may extend through the drive gear. The drive gear may be rotatable with respect to the input shaft. The drive gear may have a first face gear that may be arranged around the input shaft. The interaxle differential unit may be disposed on the input shaft. The interaxle differential unit may have a side gear. The side gear may receive the input shaft such that the side gear may be rotatable with respect to the input shaft. The side gear may have a first side gear face gear and a second side gear face gear. The first side gear face gear may be disposed opposite the second side gear face gear. The output shaft may be rotatable with respect to the side gear. The first clutch collar may have a first clutch collar face gear. The first clutch collar face gear may be selectively engageable with the first face gear. The second clutch collar may receive the output shaft. The second clutch collar may have a second clutch collar face gear. The second clutch collar face gear may be selectively engageable with the second side gear face gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
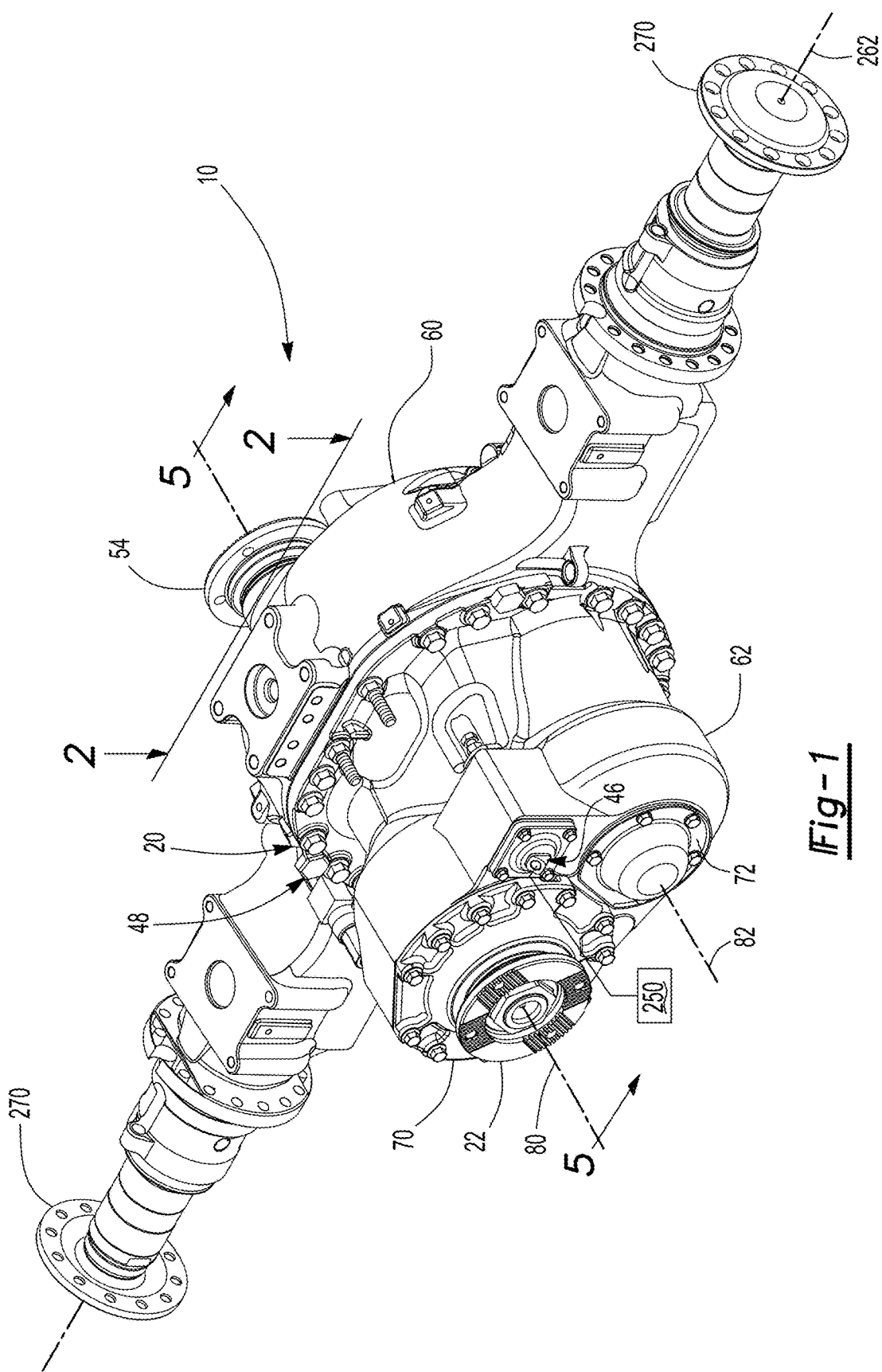
FIG. 1 is a perspective view of an axle assembly.

Referring to FIG. 1, an example of an axle assembly 10 is shown. The axle assembly 10 may be provided with a vehicle, such as a motor vehicle like a truck, bus, farm equipment, military transport or weaponry vehicle, or cargo loading equipment for land, air, or marine vessels.

The axle assembly 10 may be part of a vehicle drivetrain that may provide torque to propel the vehicle. For example, the axle assembly 10 may be a drive axle that may provide torque to one or more traction wheel assemblies that may include a tire mounted on a wheel. The drive axle may receive torque from a power source, such as an engine or motor. For example, the power source may be operatively coupled to the input of a transmission and an output of the transmission may be coupled to an input of the axle assembly 10, such as with a drive shaft.

One or more axle assemblies 10 may be provided with the vehicle. For example, the axle assembly 10 may be a single drive axle assembly or may be configured as part of a tandem axle configuration or multi-axle configuration that may include a plurality of axle assemblies that may be connected in series. For example, two axle assemblies may be provided in a tandem axle configuration. The first axle assembly or axle assembly that may be first in the series may be referred to as a forward-rear axle assembly. The second axle assembly may be referred to as a rear-rear axle assembly. An output of the first axle assembly may be selectively coupled to an input of the second axle assembly, such as with a prop shaft.

The axle assemblies may be liftable or non-liftable. A liftable axle assembly may be selectively lifted and held such that its associated wheel assemblies are raised or lifted from a support surface, like a road or the ground, and moved toward the chassis of the vehicle such that the wheel assemblies do not engage the support surface to support the weight of the vehicle. An axle lift system may be used to raise or lift the axle assembly. A non-liftable axle assembly may be configured such that its associated wheel assemblies may be disposed on the support surface during normal operation to support the vehicle and facilitate movement of the vehicle. A non-liftable axle assembly may not be held in a lifted position or a secured position by an axle lift system such that its associated wheel assemblies are raised or lifted from the support surface toward the chassis and held in the secured position such that an associated wheel assembly is lifted above and does not engage the support surface or support the weight of the vehicle.

Figure 2:
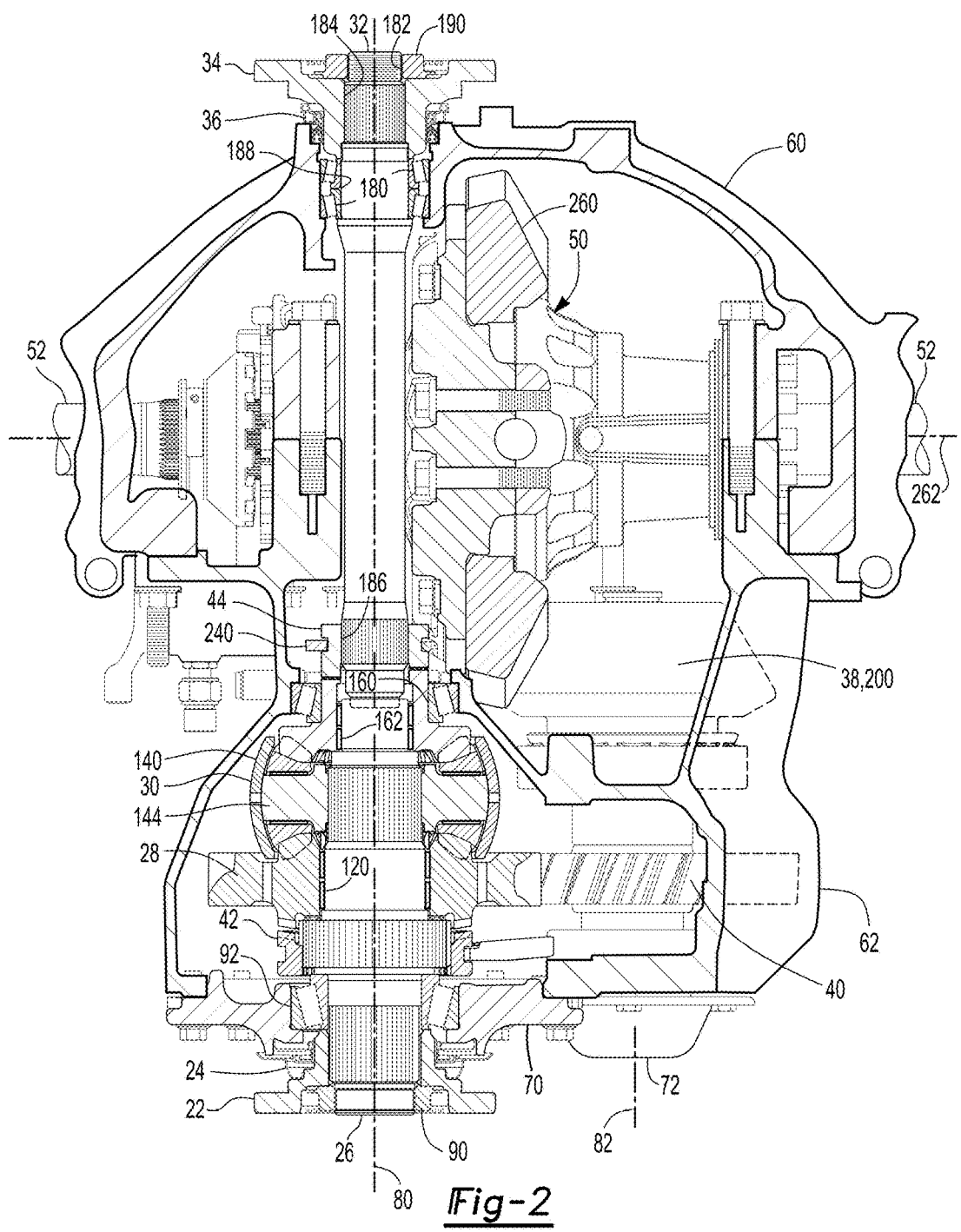
FIG. 2 is a top section view of the axle assembly along section line 2-2.
Figure 3:
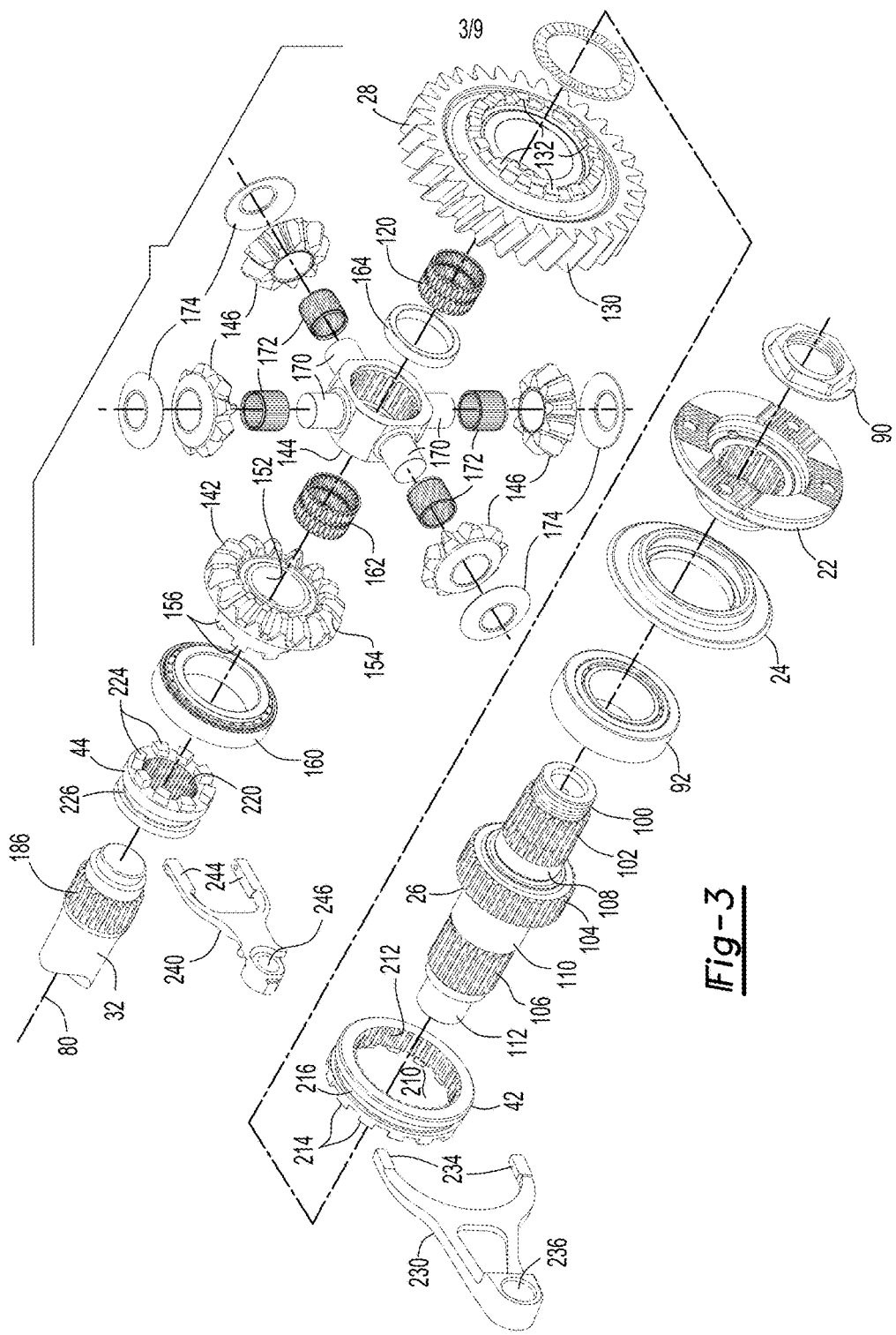
FIGS. 3 and 4 are exploded views of a portion of the axle assembly.

Referring to FIGS. 1-3, the axle assembly 10 is shown in more detail. The axle assembly 10 may include a housing assembly 20, an input coupling 22, a first seal assembly 24, an input shaft 26, a drive gear 28, an interaxle differential unit 30, an output shaft 32, an output coupling 34, a second seal assembly 36, a drive pinion 38, a driven gear 40, a first clutch collar 42, a second clutch collar 44, a first clutch collar actuator mechanism 46, a second clutch collar actuator mechanism 48, a differential assembly 50, and at least one axle shaft 52.

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 60 and a differential carrier 62.

The axle housing 60 may receive the axle shafts 52 and may support the wheel assemblies. The axle housing 60 may include a center portion and a pair of arm portions. The center portion may be disposed proximate the center of the axle housing 60. The center portion may define an opening that may face toward the differential carrier 62 and may have a cavity that may receive at least a portion of the differential assembly 50. The arm portions may extend in opposite directions from the center portion and may each receive an axle shaft 52.

The differential carrier 62 may be mounted on the axle housing 60. For example, the differential carrier 62 may be mounted on the center portion of the axle housing 60 with a plurality of fasteners, such as bolts. The differential carrier 62 may support the differential assembly 50. As is best shown in FIGS. 1 and 2, the differential carrier 62 may include a first cover 70 and a second cover 72.

The first cover 70 and the second cover 72 may be disposed on the differential carrier 62. For example, the first cover 70 and the second cover 72 may be disposed at an end of the differential carrier 62 that may be disposed opposite the axle housing 60. The first cover 70 and the second cover 72 may be coupled to the differential carrier 62 in any suitable manner, such as with one or more fasteners like bolts. The first cover 70 may be positioned along a first axis 80 and may have an opening through which the input shaft 26 may extend. The second cover 72 may be positioned along a second axis 82 and may be spaced apart from the first cover 70. The second cover 72 may be aligned with and may cover the drive pinion 38.

Referring to FIG. 1-4, the input coupling 22 may facilitate coupling of the axle assembly 10 to a torque source. For example, the input coupling 22 may be operatively connected to a drive shaft. As is best shown in FIG. 2, the input coupling 22 may be disposed on the input shaft 26 and may be at least partially disposed outside the differential carrier 62. The input coupling 22 may be fixedly positioned with respect to the input shaft 26. For example, the input coupling 22 may have a hole that may receive the input shaft 26 and a set of splines that may mate with corresponding splines on the input shaft 26 to limit or inhibit rotation of the input coupling 22 about the first axis 80 with respect to the input shaft 26. In addition, a fastener 90 such as a nut may be disposed on the input shaft 26 to inhibit axial movement of the input coupling 22 along the first axis 80 with respect to the input shaft 26.

Figure 4:
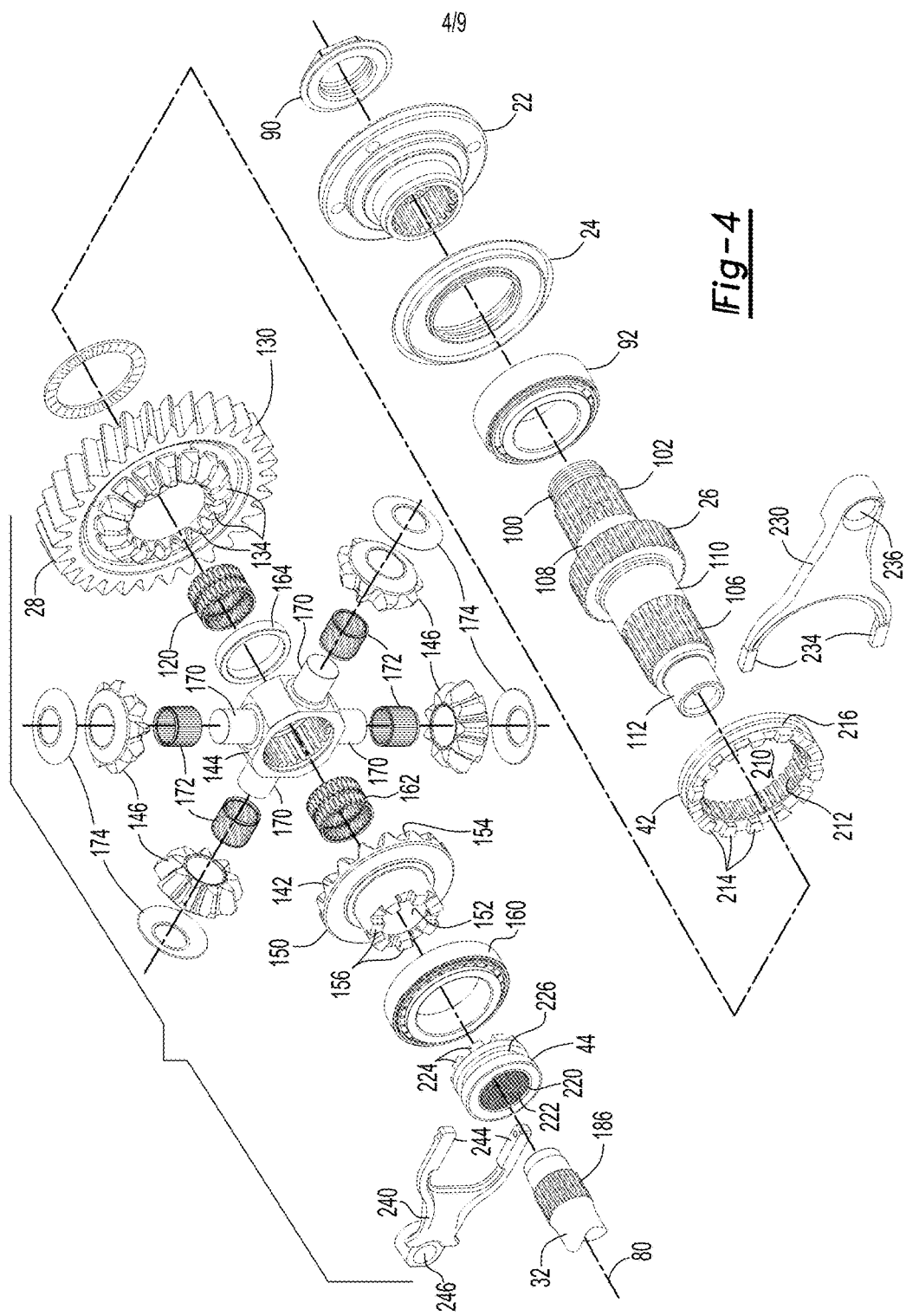

Referring to FIGS. 2-4, the first seal assembly 24 may be axially positioned along the first axis 80 between the input coupling 22 and the first cover 70. The first seal assembly 24 may block or inhibit contaminants from entering the differential carrier 62 and may help contain lubricant inside the axle assembly 10.

Referring to FIGS. 2-4, the input shaft 26 may extend along and may be configured to rotate about the first axis 80. For example, the input shaft 26 may be rotatably supported by one or more roller bearing assemblies 92 that may be disposed on the housing assembly 20.

A roller bearing assembly may include a plurality of rolling elements that may be arranged around an axis and that may rotate to facilitate rotational motion. In FIG. 2, the roller bearing assembly 92 is depicted with a set of roller bearing elements disposed between an inner race and an outer race. The inner race may be disposed on and may receive the input shaft 26. The outer race may extend around the roller bearing elements and may be disposed on the first cover 70.

Referring to FIGS. 3 and 4, the input shaft 26 may have a threaded portion 100, a first spline portion 102, a second spline portion 104, a third spline portion 106, a first bearing support surface 108, a second bearing support surface 110, and a third bearing support surface 112.

The threaded portion 100 may be disposed proximate a first end of the input shaft 26. The threaded portion 100 may include one or more threads that may extend around the first axis 80. The threads of the threaded portion 100 may facilitate mounting of the fastener 90.

The first spline portion 102 may be axially positioned along the first axis 80 between the threaded portion 100 and the first bearing support surface 108. The first spline portion 102 may have a plurality of splines that may be arranged around the first axis 80. For example, the splines may be disposed substantially parallel to the first axis 80 and may extend away from the first axis 80. The first spline portion 102 may mate with corresponding splines on the input coupling 22 to inhibit or limit rotation of the input coupling 22 with respect to the input shaft 26.

The second spline portion 104 may be axially positioned along the first axis 80 between the first bearing support surface 108 and the second bearing support surface 110. The second spline portion 104 may have a plurality of splines that may be arranged around the first axis 80. For example, the splines may be disposed substantially parallel to the first axis 80 and may extend away from the first axis 80. Moreover, the second spline portion 104 may be disposed further away from the first axis 80 than the first spline portion 102 and the third spline portion 106 in one or more embodiments. The second spline portion 104 may mate with corresponding splines on the first clutch collar 42 to inhibit or limit rotation of the first clutch collar 42 with respect to the input shaft 26.

The third spline portion 106 may be axially positioned between the second bearing support surface 110 and the third bearing support surface 112. The third spline portion 106 may have a plurality of splines that may be arranged around the first axis 80. For example, the splines may be disposed substantially parallel to the first axis 80 and may extend away from the first axis 80. The third spline portion 106 may mate with corresponding splines on a spider of the interaxle differential unit 30 inhibit or limit rotation of the spider with respect to the input shaft 26.

The first bearing support surface 108 may be axially positioned between the first spline portion 102 and the second spline portion 104. The roller bearing assembly 92 may be disposed on the first bearing support surface 108.

The second bearing support surface 110 may be axially positioned between the second spline portion 104 and the third spline portion 106. The second bearing support surface 110 may rotatably support the drive gear 28 or may support a bearing that may rotatably support the drive gear 28.

The third bearing support surface 112 may be axially positioned between a second end of the input shaft 26 and the third spline portion 106. The third bearing support surface 112 may rotatably support a side gear of the interaxle differential unit 30 or may support a bearing that may rotatably support the side gear as will be discussed in more detail below.

Referring to FIGS. 2-4, the drive gear 28 may be disposed proximate the input shaft 26. For example, the drive gear 28 may have a center bore that may receive a roller bearing assembly 120 that may be disposed on the second bearing support surface 110 of the input shaft 26 and that may rotatably support the drive gear 28. The roller bearing assembly 120, if provided, may facilitate rotation of the drive gear 28 around or with respect to the input shaft 26 under certain operating conditions as will be discussed in more detail below. The drive gear 28 may include an outer gear 130, a first face gear 132, and a second face gear 134.

The outer gear 130 may include a plurality of teeth that may engage and may mesh with teeth on the driven gear 40. For example, the teeth may be arranged around the first axis 80 and may be located at an outer diameter of the drive gear 28.

The first face gear 132 may include a set of teeth that may be arranged around the first axis 80 on a side or face of the drive gear 28 that may face away from the interaxle differential unit 30 and toward the first clutch collar 42. The teeth of the first face gear 132 may selectively engage teeth on the first clutch collar 42 as will be discussed in more detail below.

The second face gear 134 may be disposed on an opposite side of the drive gear 28 from the first face gear 132. The second face gear 134 may include a set of teeth that may be arranged on a side or face of the drive gear 28 that faces toward the interaxle differential unit 30.

Referring to FIG. 2, the interaxle differential unit 30 may compensate for speed differences between different drive axle assemblies, such as speed differences between axle assemblies that are connected in series. In at least one configuration, such as is best shown in FIGS. 2-4, the interaxle differential unit 30 may include a case 140, a side gear 142, a spider 144, and a plurality of pinion gears 146. It is to be understood that other interaxle differential unit configurations may be provided.

Referring to FIG. 2, the case 140 may be disposed inside the differential carrier 62. The case 140 may at least partially receive the side gear 142, spider 144, and pinion gears 146. In addition, the second face gear 134 of the drive gear 28 may extend into and may be received in the case 140. The case 140 may be axially positioned along the first axis 80 between the drive gear 28 and the side gear 142.

Referring to FIGS. 2-4, the side gear 142 may be disposed proximate an end of the input shaft 26. For example, the side gear 142 may have a center bore that may receive and support the input shaft 26. In at least one configuration, the side gear 142 may include an outer side gear surface 150, a first side gear face gear 154, and a second side gear face gear 156.

The outer side gear surface 150 may extend around the first axis 80 and may face away from the first axis 80. An outer roller bearing assembly 160 may be disposed proximate and may engage the outer side gear surface 150. As such, the outer roller bearing assembly 160 may rotatably support the side gear 142 and the input shaft 26. The outer side gear surface 150 may extend axially from the second side gear face gear 156 to an enlarged flange of the side gear 142 that includes the first side gear face gear 154. Accordingly, the outer side gear surface 150 may have a smaller diameter than the first side gear face gear 154.

The inner side gear surface 152 may be disposed opposite the outer side gear surface 150 and may define the center bore of the side gear 142. As such, the inner side gear surface 152 may extend around the first axis 80 and may face toward from the first axis 80. An inner roller bearing assembly 162 may be disposed in the center bore and may extend in a radial direction from the inner side gear surface 152 to the third bearing support surface 112 of the input shaft 26. The inner roller bearing assembly 162 may rotatably support the side gear 142 such that the side gear 142 may be rotatable with respect to the input shaft 26. In addition, the outer roller bearing assembly 160 may be disposed opposite and may extend at least partially around the inner roller bearing assembly 162.

The first side gear face gear 154 may include a set of teeth that may be arranged around the first axis 80 and the center bore of the side gear 142. The first side gear face gear 154 may be disposed on a side or face of the side gear 142 that may face toward the interaxle differential unit 30. The teeth of the first side gear face gear 154 may extend into the case 140 and may mesh with teeth on the pinion gears 146.

The second side gear face gear 156 may be disposed on an opposite side of the side gear 142 from the first side gear face gear 154. As such, the teeth of the first side gear face gear 154 and the teeth of the second side gear face gear 156 may extend in opposite directions. The second side gear face gear 156 may include a set of teeth that may be arranged around the first axis 80 on a side or face of the side gear 142 that may face toward the second clutch collar 44. The teeth of the first side gear face gear 154 may extend radially from the inner side gear surface 152 to the outer side gear surface 150 and may be spaced apart from and may not engage the teeth of the first side gear face gear 154. The teeth of the first side gear face gear 154 may selectively engage teeth on the second clutch collar 44 as will be discussed in more detail below.

The spider 144 may be axially positioned along the first axis 80 between the drive gear 28 and the side gear 142. The spider 144 may be fixedly positioned with respect to the input shaft 26. For instance, the spider 144 may include a center bore that may include splines that may mate with the third spline portion 106 of the input shaft 26 to limit or inhibit rotation of the spider 144 with respect to the input shaft 26. As such, the spider 144 may rotate about the first axis 80 with the input shaft 26.

A spacer 164 may be disposed between the spider 144 and the drive gear 28 to limit or inhibit axial movement of the spider 144 along the input shaft 26. The spacer 164 may be configured as a ring that may extend around the input shaft 26 and may extend axially from the roller bearing assembly 120 to the spider 144. As such, the input shaft 26 and the side gear 142 may cooperate to inhibit axial movement of the spider 144, spacer 164, and roller bearing assembly 120.

The spider 144 may also include one or more pins 170 that may extend away from the center bore of the spider 144. The pins 170 may be fixedly positioned with respect to the case 140.

One or more pinion gears 146 may be provided with the interaxle differential unit 30. Each pinion gear 146 may be rotatably disposed on a corresponding pin 170 of the spider 144. For example, the pinion gear 146 may have a center bore that may receive a roller bearing assembly 172 that may be disposed on the pin 170 and that may rotatably support the pinion gear 146. The pinion gear 146 may include teeth that may mate with the second face gear 134 of the drive gear 28 and may mate with the first side gear face gear 154 of the side gear 142. A washer 174 may be provided between the case 140 and the pinion gear 146 to reduce friction and facilitate rotation of the pinion gear 146.

Referring to FIGS. 2-4, the output shaft 32, which may also be referred to as a through shaft, may extend along and may be configured to rotate about the first axis 80. As such, the output shaft 32 may be coaxially disposed with the input shaft 26. The output shaft 32 may be rotatably supported by one or more roller bearing assemblies 180 that may be disposed on the housing assembly 20. The output shaft 32 may have an output shaft threaded portion 182, a first output shaft spline portion 184, a second output shaft spline portion 186, and an output shaft bearing support surface 188.

Referring to FIG. 2, the output shaft threaded portion 182 may be disposed proximate an end of the output shaft 32 that may be disposed opposite the input shaft 26 and outside of the housing assembly 20. The output shaft threaded portion 182 may include one or more threads that may extend around the first axis 80.

The first output shaft spline portion 184 may be axially positioned along the first axis 80 between the output shaft threaded portion 182 and the output shaft bearing support surface 188. The first output shaft spline portion 184 may have a plurality of splines that may be arranged around the first axis 80. For example, the splines may be disposed substantially parallel to the first axis 80 and may extend away from the first axis 80. The first output shaft spline portion 184 may mate with corresponding splines on the output coupling 34 to inhibit or limit rotation of the output coupling 34 with respect to the output shaft 32.

Figure 5:
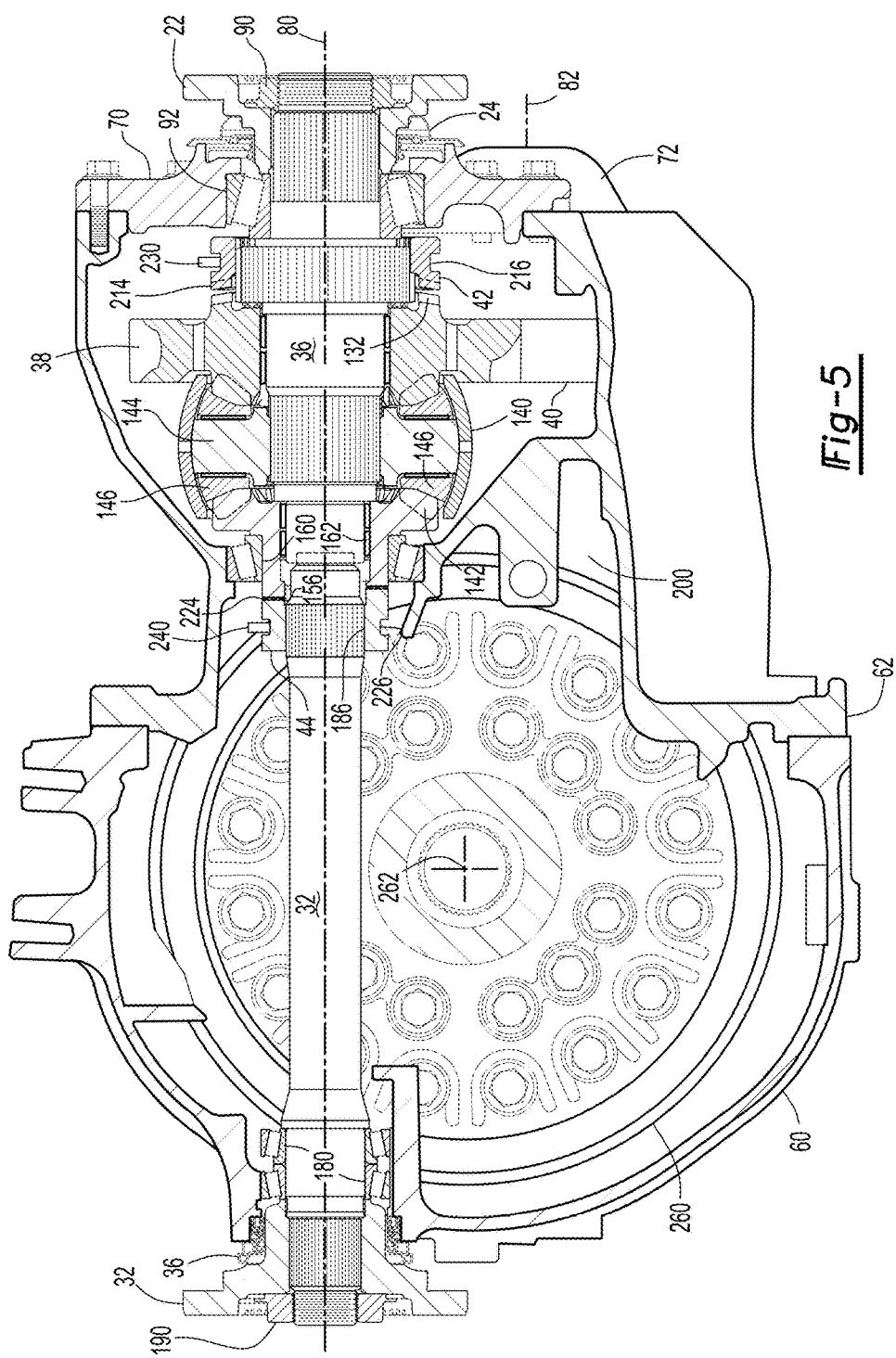
FIG. 5 is a section view of the axle assembly along a first axis and section line 5-5, the section view showing a first clutch collar in a retracted position and the second clutch collar in an engaged position.

Referring to FIGS. 3 and 4, the second output shaft spline portion 186 may be axially positioned along the first axis 80 between the output shaft bearing support surface 188 and a second end of the output shaft 32 that is disposed opposite the output coupling 34. The second output shaft spline portion 186 may have a plurality of splines that may be arranged around the first axis 80. For example, the splines may be disposed substantially parallel to the first axis 80 and may extend away from the first axis 80. As is best shown in FIG. 5, the second output shaft spline portion 186 may mate with corresponding splines on the second clutch collar 44 to inhibit or limit rotation of the second clutch collar 44 with respect to the output shaft 32. The output shaft 32 and the second output shaft spline portion 186 may extend in an axial direction and may extend completely through the second clutch collar 44. The second output shaft spline portion 186 may also be partially received in the center bore of the side gear 142 but may be spaced apart from and may not engage the side gear 142 and the input shaft 26. As such, the output shaft 32 may be rotatable about the first axis 80 with respect to the input shaft 26 and the side gear 142 depending on the position of the second clutch collar 44 as will be discussed in more detail below.

Referring to FIG. 2, the output shaft bearing support surface 188 may be axially positioned between the first output shaft spline portion 184 and the second output shaft spline portion 186. For example, the output shaft bearing support surface 188 may be disposed adjacent to the first output shaft spline portion 184. One or more roller bearing assemblies 180 may be disposed on the first bearing support surface 108.

Referring to FIGS. 1 and 2, the output coupling 34 may facilitate coupling of the axle assembly 10 to another axle assembly. For instance, the output coupling 34 may be coupled to a connecting shaft, such as a prop shaft. The output coupling 34 may be fixedly positioned with respect to the output shaft 32. For example, the output coupling 34 may have a hole that may receive the output shaft 32 and a set of splines that may mate with the first output shaft spline portion 184 of the input shaft 26 to limit or inhibit rotation of the output coupling 34 about the first axis 80 with respect to the output shaft 32. In addition, may fastener 190, such as a nut, may be disposed on the output shaft 32 to inhibit axial movement of the output coupling 34 along the first axis 80 with respect to the output shaft 32.

Referring to FIGS. 2-4, the second seal assembly 36 may be axially positioned along the first axis 80 between the output coupling 34 and the axle housing 60. The second seal assembly 36 may block or inhibit contaminants from entering the axle housing 60 and may help contain lubricant inside the axle assembly 10.

Figure 9:
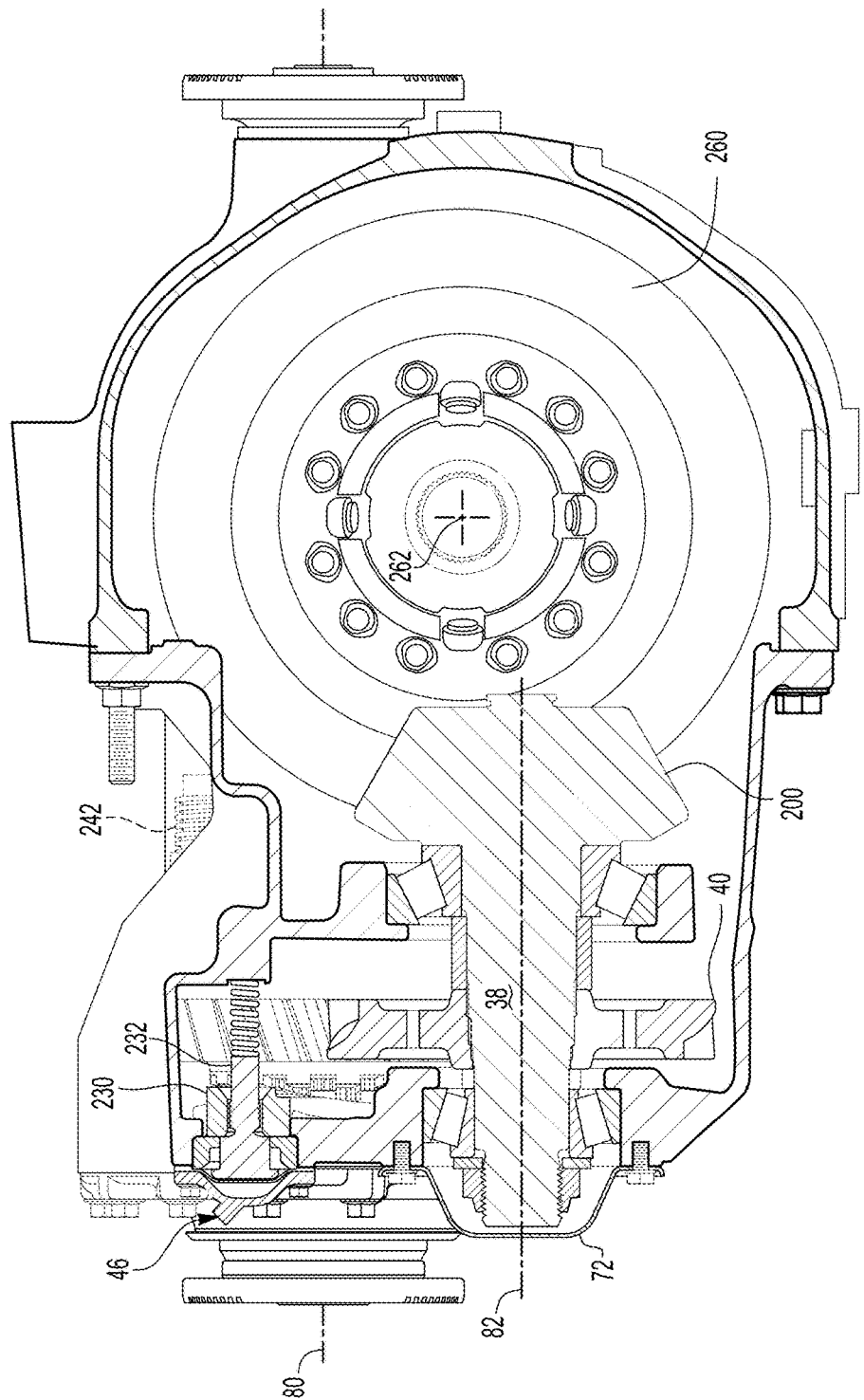
FIG. 9 is a section view of the axle assembly along a second axis and section line 6-6.

Referring to FIGS. 2 and 9, the drive pinion 38 may be spaced apart from the input shaft 26 and may be rotatable about the second axis 82. The drive pinion 38 may extend through the driven gear 40 and may not rotate with respect to the driven gear 40. For example, the drive pinion 38 and the driven gear 40 may have mating splines that inhibit rotation of the drive pinion 38 with respect to the driven gear 40. Accordingly, the drive pinion 38 may rotate with the driven gear 40 about the second axis 82. The drive pinion 38 may have a gear portion 200 that may be disposed at an end of the drive pinion 38. The gear portion 200 may include a set of teeth that mate with corresponding teeth on a ring gear of the differential assembly 50.

The driven gear 40 may interconnect the drive gear 28 and the drive pinion 38. The driven gear 40 may have a center bore that may receive the drive pinion 38. The driven gear 40 may include a plurality of teeth that may mesh with the outer gear 130 of the drive gear 28. The teeth may be arranged around the second axis 82 and may be located at an outer diameter of the driven gear 40.

Referring to FIGS. 2-4, the first clutch collar 42 may be moveably disposed on the input shaft 26. For example, the first clutch collar 42 may be movably disposed on the second spline portion 104 of the input shaft 26. The first clutch collar 42 may move axially or move along the first axis 80 between a retracted position and an extended position as will be discussed in more detail below. The first clutch collar 42 may be generally ring-shaped and may include a first clutch collar hole 210, a first set of splines 212, a first clutch collar face gear 214, and a first annular groove 216.

The first clutch collar hole 210 may extend through the first clutch collar 42 and around the first axis 80. The first clutch collar hole 210 may receive the input shaft 26.

The first set of splines 212 may be disposed in the first clutch collar hole 210 and may extend toward the first axis 80. The splines 212 may mate with the second spline portion 104 of the input shaft 26 to inhibit or limit rotation of the first clutch collar 42 with respect to the input shaft 26. As such, the first clutch collar 42 may rotate with the input shaft 26 about the first axis 80.

The first clutch collar face gear 214 may include a set of teeth that may extend toward the drive gear 28. The set of teeth may be arranged around the first axis 80 and may selectively engage the teeth of the first face gear 132 of the drive gear 28 depending on the position of the first clutch collar 42 as will be discussed in more detail below.

The first annular groove 216 may be disposed opposite the first clutch collar hole 210. For example, the first annular groove 216 may be disposed opposite the splines 212 and may extend toward the first axis 80. The first annular groove 216 may be axially positioned between the first clutch collar face gear 214 and a side of the first clutch collar 42 that is disposed opposite the first clutch collar face gear 214. The first annular groove 216 may facilitate connection of the first clutch collar 42 to the first clutch collar actuator mechanism 46 as will be discussed in more detail below.

Referring to FIGS. 2-4, the second clutch collar 44 may be moveably disposed on the output shaft 32. For example, the second clutch collar 44 may be movably disposed on the second output shaft spline portion 186 of the output shaft 32. The second clutch collar 44 may move axially or move along the first axis 80 between a disengaged position and an engaged position as will be discussed in more detail below. The second clutch collar 44 may be generally ring-shaped and may include a second clutch collar hole 220, a second set of splines 222, a second clutch collar face gear 224, and a second annular groove 226.

The second clutch collar hole 220 may extend through the second clutch collar 44 and around the first axis 80. The second clutch collar hole 220 may receive the output shaft 32. In addition, the second clutch collar hole 220 may not receive the side gear 142 or extend around the outer side gear surface 150 of the side gear 142.

The second set of splines 222 may be disposed in the second clutch collar hole 220 and may extend toward the first axis 80. The splines 222 may mate with the second output shaft spline portion 186 of the output shaft 32 to inhibit or limit rotation of the second clutch collar 44 with respect to the output shaft 32. As such, the second clutch collar 44 may rotate with the output shaft 32 about the first axis 80.

The second clutch collar face gear 224 may include a set of teeth that may extend toward the side gear 142. The set of teeth may be arranged around the first axis 80 and may selectively engage the second side gear face gear 156 of the side gear 142 depending on the position of the second clutch collar 44 as will be discussed in more detail below. As such, the teeth of the second clutch collar face gear 224 and the teeth of the second side gear face gear 156 may mesh in an end-to-end axial relationship rather than a radial relationship.

The second annular groove 226 may be disposed opposite the second clutch collar hole 220. For example, the second annular groove 226 may be disposed opposite the splines 222 and may extend toward the first axis 80. The second annular groove 226 may be axially positioned between the second clutch collar face gear 224 and a side of the second clutch collar 44 that is disposed opposite the second clutch collar face gear 224. The second annular groove 226 may facilitate connection of the second clutch collar 44 to the second clutch collar actuator mechanism 48 as will be discussed in more detail below.

Referring to FIGS. 1-4 and 9, the first clutch collar actuator mechanism 46 may be configured to actuate the first clutch collar 42 in an axial direction or along the first axis 80 between a retracted position and an extended position as will be discussed in more detail below. The first clutch collar actuator mechanism 46 may include a first linkage 230 and a first actuator 232.

Referring to FIGS. 3, 4, and 9 the first linkage 230 may extend from the first clutch collar 42 to the first actuator 232.

The first linkage 230 may have any suitable configuration. For example, the first linkage 230 may be configured as a shift fork that may have one or more mating features 234 and a first hole 236. The mating features 234 may be received in the first annular groove 216. The first hole 236 may receive a shaft of the first actuator 232.

Referring to FIG. 9, the first actuator 232 may be disposed in the housing assembly 20. The first actuator 232 may have any suitable configuration. For example, the first actuator 232 may be a motor, a pneumatic actuator, a hydraulic actuator or the like. For instance, an actuator that is configured as a pneumatic actuator may have a biasing member such as a spring and a piston that may be disposed on the shaft and received in a chamber. The chamber may be partially defined by the second cover 72. The biasing member may actuate the first linkage 230 and a first direction. Pressurized air that is provided to the chamber may exert force on the piston to actuate the shaft in a second direction that may be disposed opposite the first direction.

Referring to FIGS. 2-4 and 9, the second clutch collar actuator mechanism 48 may be configured to actuate the second clutch collar 44 in an axial direction or along the first axis 80 between an engaged position and a disengaged position as will be discussed in more detail below. The second clutch collar actuator mechanism 48 may include a second linkage 240 and a second actuator 242.

The second linkage 240 may extend from the second clutch collar 44 to the second actuator 242. The second linkage 240 may have any suitable configuration. For example, the second linkage 240 may be configured as a shift fork that may have one or more mating features 244 and a second hole 246. The mating features 244 may be received in the second annular groove 226 of the second clutch collar 44. The second hole 246 may receive a shaft of the second actuator 242.

The second actuator 242 may be disposed in the housing assembly 20. The second actuator 242 may have any suitable configuration. For example, the second actuator 242 may be a motor, a pneumatic actuator, a hydraulic actuator or the like. For instance, an actuator that is configured as a pneumatic actuator may have a spring and a piston as previously described with respect to the first actuator 232.

Referring to FIG. 1, the first actuator 232 and the second actuator 242 may be controlled by an electronic controller 250 or control system. Electronic controller 250 may monitor and control operation of various vehicle systems and components. For instance, the electronic controller 250 may control operation of the first clutch collar actuator mechanism 46 and the second clutch collar actuator mechanism 48. In a configuration in which the first clutch collar actuator mechanism 46 and the second clutch collar actuator mechanism 48 are pneumatically or hydraulically powered, the electronic controller 250 may open and close corresponding valves to provide fluid to or vent fluid from the first actuator 232 and the second actuator 242 actuate the first clutch collar 42 and the second clutch collar 44, respectively. The electronic controller 250 may control actuation of the first clutch collar 42 and the second clutch collar 44 automatically or in response to a driver command that may be provided by an input device, such as a lever or button.

Referring to FIG. 2, the differential assembly 50 may be received in the center portion when the differential carrier 62 is assembled to the housing assembly 20. The differential assembly 50 may transmit torque to the vehicle traction wheel assemblies and permit the traction wheel assemblies to rotate at different velocities in a manner known by those skilled in the art. A ring gear 260 may be fixedly mounted on a case of the differential assembly. The ring gear 260 may have teeth that may mesh with the gear portion 200 of the drive pinion 38. Rotation of the drive pinion 38 may rotate the ring gear 260 and the differential case about a third axis 262. The ring gear 260 may be operatively connected to the axle shafts 52 by the differential assembly 50. As such, the differential assembly 50 may receive torque via the ring gear 260 and provide torque to the axle shafts 52.

Referring to FIGS. 1 and 2, the axle shafts 52 may transmit torque from the differential assembly 50 to corresponding traction wheel assemblies. In FIG. 2, portions of two axle shafts 52 are shown. Each axle shaft 52 may extend through a different arm portion of axle housing 60. The axle shafts 52 may extend along and may be rotated about the third axis 262 by the differential assembly 50. Each axle shaft 52 may have a first end and a second end. The first end may be coupled to the differential assembly 50. The second end may be disposed opposite the first end and may be operatively connected to a wheel end assembly that may have a wheel hub that may support a wheel. As shown in FIG. 1, an axle flange 270 may be disposed proximate the second end of the axle shaft 52 and may facilitate coupling of the axle shaft 52 to the wheel hub.

Operation of the axle assembly 10 will now be described in more detail with reference to FIGS. 5-8.

Referring to FIG. 5, the first clutch collar 42 is shown in a retracted position and the second clutch collar 44 in the engaged position. In the retracted position, the first clutch collar 42 may be disengaged from the drive gear 28. More specifically, the first clutch collar face gear 214 of the first clutch collar 42 may be disengaged from the second face gear 134 of the drive gear 28 when in the retracted position. As such, the interaxle differential unit 30 may be unlocked and torque may be transmitted to the drive gear 28 by the interaxle differential unit 30. The drive gear 28 may then transmit torque to the differential assembly 50 by way of the driven gear 40, drive pinion 38, and the ring gear 260. In the engaged position, the second clutch collar face gear 224 of the second clutch collar 44 may mesh with the second side gear face gear 156 of the side gear 142. As such, torque may be transmitted to the output shaft 32 and to another axle assembly due to the engagement of the second clutch collar 44 and a side gear 142. Accordingly, torque is transmitted to the differential assembly 50 and the output shaft 32, and the input shaft 26 and the output shaft 32 may not rotate together about the first axis 80 (i.e., the input shaft 26 and the output shaft 32 may rotate at different rotational velocities). The positioning shown in FIG. 5 may be employed when wheel assemblies associated with the axle assembly 10 and another axle assembly that receives torque via the output shaft 32 are not lifted and are disposed on the support surface. Moreover, this positioning may be used when the vehicle is loaded for fully loaded to help propel the vehicle.

Figure 6:
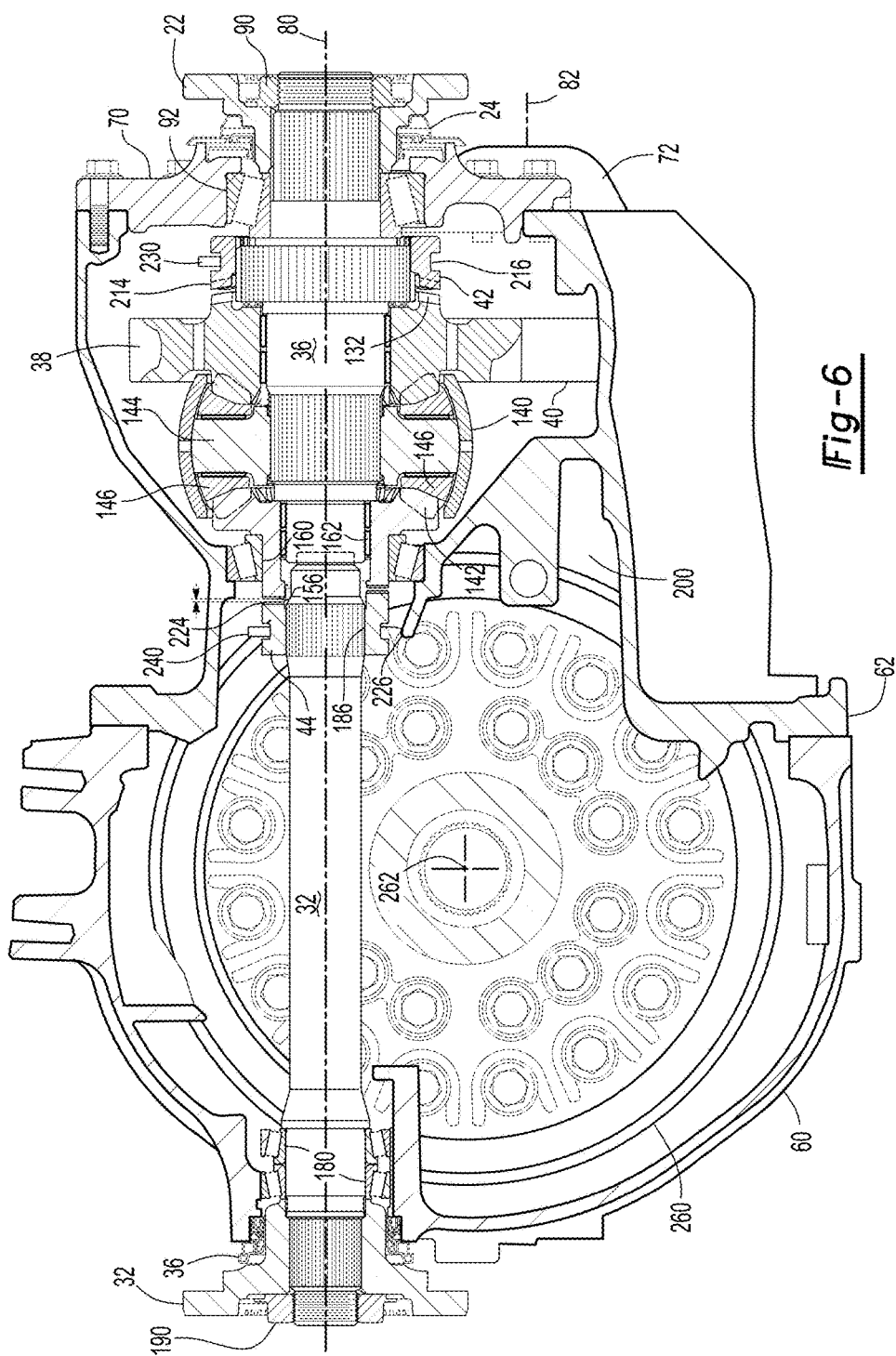
FIG. 6 is a section view of the axle assembly showing the first clutch collar in the retracted position and the second clutch collar in a disengaged position.

Referring to FIG. 6, the first clutch collar 42 is shown in the retracted position and the second clutch collar 44 is shown in the disengaged position. In the disengaged position, the second clutch collar face gear 224 second clutch collar 44 may be spaced apart from and may not engage the second side gear face gear 156 of the side gear 142. As such, torque may not be transmitted from the input shaft 26 to the output shaft 32 and to another axle assembly. Moreover, torque that is transmitted to the input shaft 26 may not be transmitted to the drive gear 28 and the differential assembly 50 as the torque may be transmitted through the interaxle differential unit 30 may cause the side gear 142 to freely spin about the first axis 80, which provides less rotational resistance than is provided by the drive gear 28 and downstream components, such as the driven gear 40, drive pinion 38, differential assembly 50, and axle shafts 52. The positioning shown in FIG. 6 would result in no propulsion torque being provided to the wheel assemblies associated with the axle assembly 10 and another axle assembly that receives torque via the output shaft 32. As such, this positioning may not be used in a tandem axle configuration when propulsion of the vehicle is desired.

Figure 7:
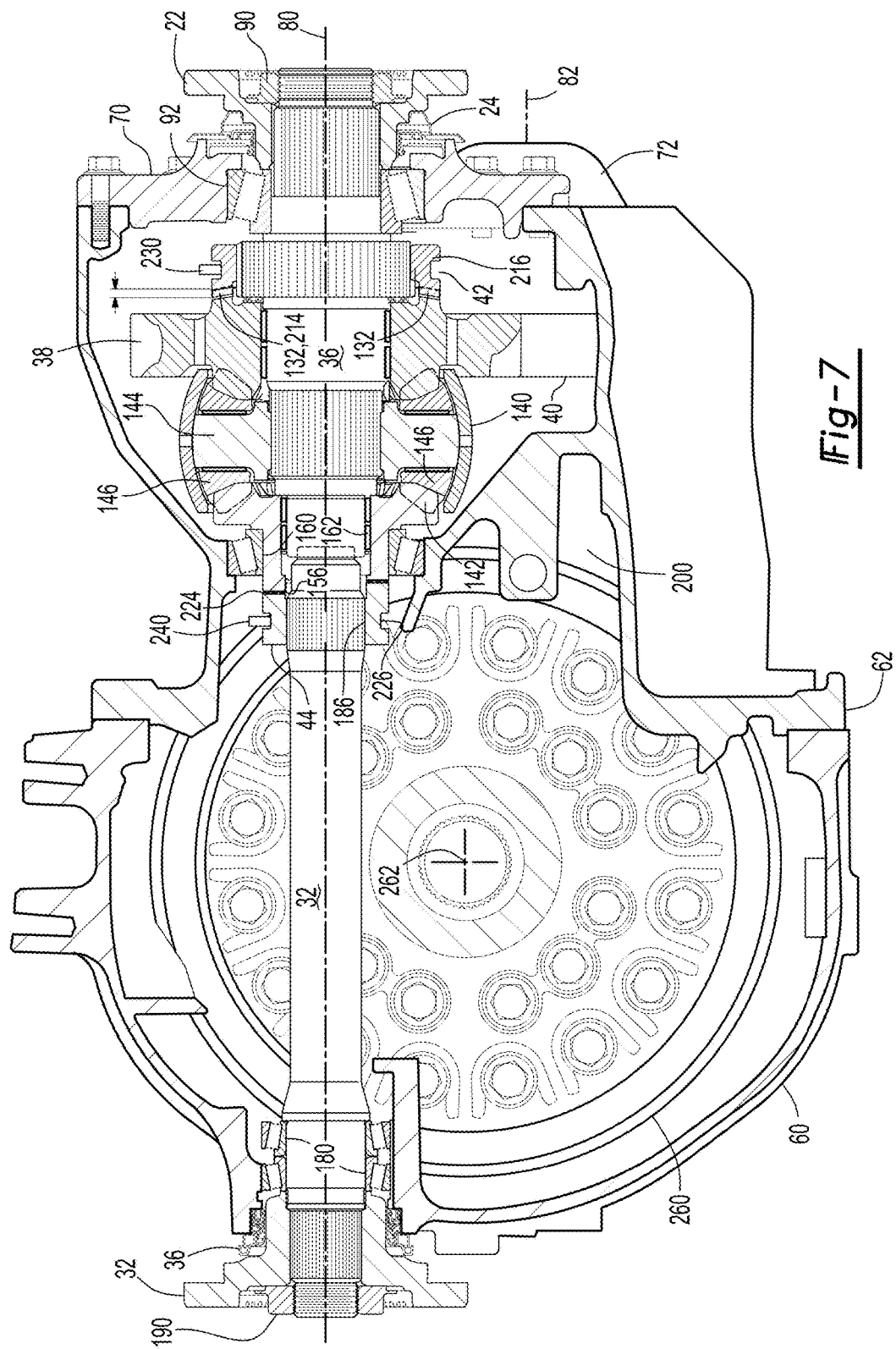
FIG. 7 is a section view of the axle assembly showing the first clutch collar in an extended position and the second clutch collar in the engaged position.

Referring to FIG. 7, the first clutch collar 42 is shown in the extended position and the second clutch collar 44 is shown in the engaged position. In the extended position, the first clutch collar face gear 214 of the first clutch collar 42 may mesh with the second face gear 134 of the drive gear 28. As such, torque may be transmitted directly from the input shaft 26 to the drive gear 28 rather than via the interaxle differential unit 30. Accordingly, the drive gear 28 may not rotate about the first axis 80 with respect to the input shaft 26. Thus, the input shaft 26 and the drive gear 28 may rotate at the same speed about the first axis 80 and transmit torque to the driven gear 40 and the differential assembly 50. Torque may also be transmitted to the output shaft 32 and to another axle assembly since the second clutch collar 44 is in the engaged position. Moreover, the combination the extended position and the engaged position may lock the interaxle differential unit 30 thereby preventing the input shaft 26 and the output shaft 32 from rotating at different rotational velocities about the first axis 80. The positioning shown in FIG. 7 would provide torque to the wheel assemblies associated with the axle assembly 10 and another axle assembly that receives torque via the output shaft 32 and may be used under conditions where wheel slip is detected or likely to occur.

Figure 8:
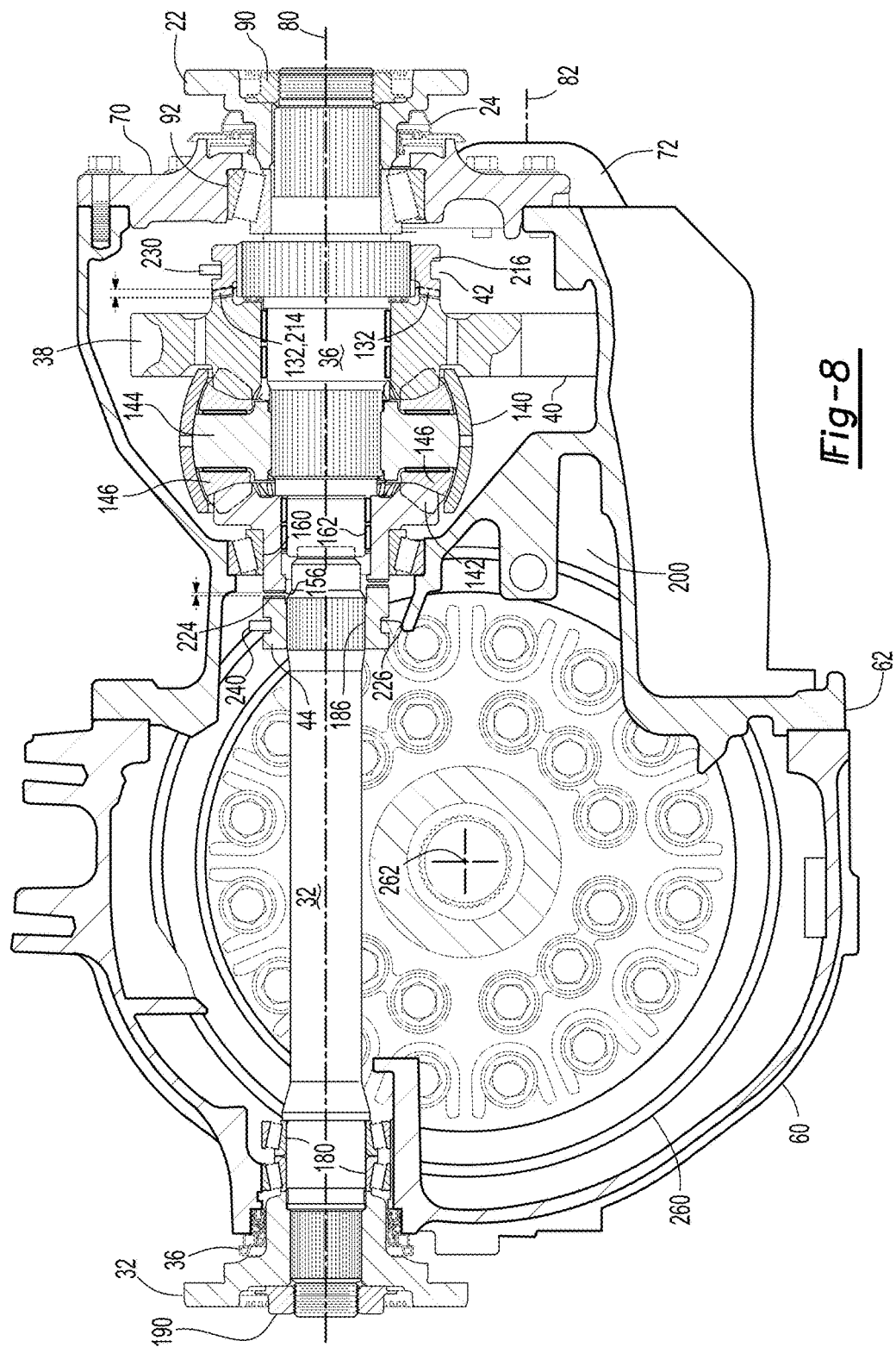
FIG. 8 is a section view of the axle assembly showing the first clutch collar in the extended position and the second clutch collar in the disengaged position.

Referring to FIG. 8, the first clutch collar 42 is shown in the extended position and the second clutch collar 44 is shown in the disengaged position. Positioning the first clutch collar 42 in the extended position allows the input shaft 26 and the drive gear 28 to rotate at the same speed about the first axis 80 and transmit torque to the driven gear 40 and the differential assembly 50 as previously discussed. Torque is not transmitted to the output shaft 32 since the second clutch collar 44 is disengaged from the side gear 142. The positioning shown in FIG. 8 may be employed when wheel assemblies associated with the axle assembly 10 are not lifted and another axle assembly that receives torque via the output shaft 32 is lifted such that its wheel assemblies are not disposed on the support surface.

The axle assembly as described above may provide a compact arrangement for providing interaxle differential functionality and for selectively providing torque to an output shaft that may provide torque to another axle assembly. This arrangement may allow the length of the output shaft to be maintained, which in turn may allow a standardized or existing propeller shaft or propeller shaft length to be used to transmit torque from the output shaft to another axle assembly. In addition, the axle assembly may allow a 6×4 axle configuration to be provided to comply with applicable regulations while allowing torque output to be controlled such that torque may not be provided to at least one axle assembly to reduce fuel consumption.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An axle assembly comprising:
   an input shaft that is rotatable around a first axis;
   a drive gear through which the input shaft extends, the drive gear being rotatable with respect to the input shaft;
   an interaxle differential unit that is disposed on the input shaft, the interaxle differential unit having a side gear that receives the input shaft such that the side gear is rotatable with respect to the input shaft;
   an output shaft that is rotatable with respect to the side gear;
   a first clutch collar that is selectively engageable with the drive gear; and
   a second clutch collar that receives the output shaft and is selectively engageable with the side gear.

2. The axle assembly of claim 1 wherein the output shaft is partially received in the side gear and does not engage the side gear and extends completely through the second clutch collar.

3. The axle assembly of claim 1 wherein the side gear does not rotate with respect to the input shaft.

4. The axle assembly of claim 1 wherein the first clutch collar does not rotate with respect to the input shaft.

5. The axle assembly of claim 1 wherein the second clutch collar does not rotate with respect to the output shaft.

6. The axle assembly of claim 1 wherein the interaxle differential unit further comprises a spider that rotates with the input shaft, wherein the drive gear is axially positioned between the first clutch collar and the spider and the side gear is axially positioned between the second clutch collar and the spider.

7. The axle assembly of claim 1 wherein the drive gear is rotatable around the first axis with respect to the input shaft when the first clutch collar is disengaged from the drive gear and the drive gear rotates with the input shaft when the first clutch collar is engaged with the drive gear.

8. The axle assembly of claim 7 wherein the side gear is rotatable around the first axis with respect to the output shaft when the second clutch collar is disengaged from the side gear and the output shaft rotates with the side gear when the second clutch collar is engaged with the side gear.

9. The axle assembly of claim 8 wherein the input shaft rotates with the output shaft about the first axis when the first clutch collar engages the drive gear so that the drive gear rotates around the first axis with the input shaft and the second clutch collar engages the side gear so that the side gear rotates around the first axis with the output shaft.

10. An axle assembly comprising:
    an input shaft that is rotatable around a first axis;
    a drive gear through which the input shaft extends, the drive gear being rotatable with respect to the input shaft and having a first face gear that is arranged around the input shaft;
    an interaxle differential unit that is disposed on the input shaft, the interaxle differential unit having a side gear that receives the input shaft such that the side gear is rotatable with respect to the input shaft, the side gear having a first side gear face gear and a second side gear face gear disposed opposite the first side gear face gear;
    an output shaft that is rotatable with respect to the side gear;
    a first clutch collar that has a first clutch collar face gear that is selectively engageable with the first face gear; and
    a second clutch collar that receives the output shaft and has a second clutch collar face gear that is selectively engageable with the second side gear face gear.

11. The axle assembly of claim 10 wherein the second clutch collar has a second clutch collar hole, wherein the output shaft is received in the second clutch collar hole.

12. The axle assembly of claim 11 wherein the side gear is not received in the second clutch collar hole.

13. The axle assembly of claim 12 wherein the first side gear face gear is spaced apart from and does not extend from the second side gear face gear.

14. The axle assembly of claim 13 wherein the second side gear face gear has teeth that extend from an inner side gear surface that faces toward the first axis to an outer side gear surface that is disposed opposite the inner side gear surface.

15. The axle assembly of claim 14 further comprising an inner roller bearing assembly that extends around the input shaft and is received in the side gear such that the inner roller bearing is disposed on the inner side gear surface, wherein the inner roller bearing assembly rotatably supports the side gear on the input shaft.

16. The axle assembly of claim 15 further comprising an outer roller bearing assembly that extends around the side gear, wherein the outer roller bearing assembly is disposed on the outer side gear surface.

17. The axle assembly of claim 14 wherein torque is transmitted from the input shaft to the output shaft when the second clutch collar face gear engages the second side gear face gear.

18. The axle assembly of claim 14 wherein torque is not transmitted from the input shaft to the output shaft when the second clutch collar face gear is disengaged from the second side gear face gear.

19. The axle assembly of claim 14 wherein torque is transmitted from the input shaft directly to the drive gear when the first clutch collar face gear engages the first face gear.

20. The axle assembly of claim 14 wherein torque is not transmitted from the input shaft directly to the drive gear when the first clutch collar face gear is disengaged from the first face gear.

* * * * *